US011352542B2

(12) United States Patent
Pisklak et al.

(10) Patent No.: US 11,352,542 B2
(45) Date of Patent: Jun. 7, 2022

(54) COMPOSITE MATERIAL FOR SLURRY YIELD ENHANCEMENT (71) Applicant: Halliburton Energy Services, Inc., Houston, TX (US)

(72) Inventors: Thomas Jason Pisklak, Cypress, TX (US); Stephanie Ruiz, Spring, TX (US); Samuel Jason Lewis, Spring, TX (US); William Cecil Pearl, Jr., Spring, TX (US); Paul Joseph Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 428 days.

(21) Appl. No.: 16/484,078

(22) PCT Filed: Dec. 3, 2018

(86) PCT No.: PCT/US2018/063620
§ 371 (c)(1),
(2) Date: Aug. 6, 2019

(87) PCT Pub. No.: WO2020/117191
PCT Pub. Date: Jun. 11, 2020

(65) Prior Publication Data
US 2021/0363403 A1    Nov. 25, 2021

(51) Int. Cl.
*C09K 8/46*        (2006.01)
*E21B 33/14*       (2006.01)
(Continued)

(52) U.S. Cl.
CPC ............ *C09K 8/46* (2013.01); *C04B 20/1077* (2013.01); *C04B 28/04* (2013.01); *E21B 33/14* (2013.01)

(58) Field of Classification Search
CPC .................................. C09K 8/46; E21B 33/14
(Continued)

(56) References Cited

U.S. PATENT DOCUMENTS 8,226,763 B2 *  7/2012  Beuchle .................. C04B 28/18
                                                      106/713
8,226,764 B2    7/2012  Beuchle et al.
(Continued)

FOREIGN PATENT DOCUMENTS

WO    2014053699 A1    4/2014
WO    2020117185       6/2020
(Continued)

OTHER PUBLICATIONS

International Search Report and Written Opinion dated Aug. 28, 2019, International PCT Application No. PCT/US2018/063620.

Primary Examiner — Zakiya W Bates
Assistant Examiner — Ashish K Varma
(74) Attorney, Agent, or Firm — McGuireWoods LLP (57) ABSTRACT Cement compositions and associated methods for cementing. An example method includes introducing a cement composition into a wellbore penetrating a subterranean formation, the cement composition comprising a composite material, a cement, and an aqueous fluid. The composite material comprises a monophase amorphous hydraulic binder material and a particulate core. The monophase amorphous hydraulic binder material coats the particulate core. The method further comprises allowing the cement composition to set in the wellbore.

20 Claims, 3 Drawing Sheets (51) Int. Cl.
*C04B 20/10* (2006.01)
*C04B 28/04* (2006.01)

(58) Field of Classification Search
USPC .......................................................... 166/293
See application file for complete search history.

(56) References Cited

U.S. PATENT DOCUMENTS

| | | | |
|---|---|---|---|
| 8,382,892 B2 | 2/2013 | Beuchle et al. | |
| 2010/0010108 A1* | 1/2010 | Lecolier | C09K 8/473 |
| | | | 521/83 |
| 2012/0152541 A1* | 6/2012 | Gabilly | C04B 28/04 |
| | | | 166/293 |
| 2016/0084037 A1* | 3/2016 | Brothers | E21B 33/14 |
| | | | 166/292 |
| 2016/0115366 A1 | 4/2016 | Maxson et al. | |
| 2017/0349485 A1* | 12/2017 | Horta | C04B 7/47 |

FOREIGN PATENT DOCUMENTS

| | | |
|---|---|---|
| WO | 2020117188 | 6/2020 |
| WO | 2020117190 | 6/2020 |
| WO | 2020117191 | 6/2020 |
| WO | 2020117192 | 6/2020 |

* cited by examiner

COMPOSITE MATERIAL FOR SLURRY YIELD ENHANCEMENT

TECHNICAL FIELD

The present disclosure relates generally to cementing operations, and more particularly, to composite materials for reducing the density of oil well cement slurries without impacting the mechanical properties of the oil well cements.

BACKGROUND

Cement compositions may be used in a variety of subterranean applications. In subterranean well construction, a pipe string (e.g., casing, liners, expandable tubulars, etc.) may be run into a wellbore and cemented in place. The process of cementing the pipe string in place is commonly referred to as "primary cementing." In a typical primary cementing operation, a cement composition may be pumped into an annulus between the walls of the wellbore and the exterior surface of the pipe string. The cement composition sets in the annular space, forming an annular sheath of hardened, substantially impermeable cement that may support and position the pipe string in the wellbore and may bond the exterior surface of the pipe string to the subterranean formation. Among other things, this cement sheath prevents the migration of fluids in the annulus and protects the pipe string from corrosion. Cement compositions may also be used in remedial cementing methods. For example, cement compositions may be used to seal cracks or holes in pipe strings or cement sheaths, to seal highly permeable formation zones or fractures, or to place a cement plug.

Reducing the density of the cement composition slurry may be beneficial in some operations. For example, reducing the slurry density lowers the equivalent circulating density and reduces the hydrostatic pressure in the well. However, lowering the slurry density may also affect the mechanical performance of the set cement composition. An oil well cement needs to maintain a certain compressive strength in order to maintain the pipe string in the desired position and seal the annulus. The present disclosure provides improved methods and compositions for reducing the density of a cement slurry without compromising the compressive strength.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates generally to cementing operations, and more particularly, to composite materials for reducing the density of oil well cement slurries without impacting the mechanical properties of the oil well cements.

In the following detailed description of several illustrative examples, reference is made to the accompanying drawings that form a part hereof, and in which is shown by way of illustration examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of cement compositions in wellbore operations. The cement compositions may be introduced into a wellbore penetrating a subterranean formation. The subterranean formation may be a subterranean formation subject to or intended to be subject to a cementing operation. Advantageously, the cement compositions possess greater water fractions, less cementitious material, and lower slurry densities without impact to the mechanical properties of the set cement, for example, without reduction in the compressive strength of the set cement. An additional advantage is that this reduced density cement slurry provides a lower equivalent circulating density during wellbore operations. One other advantage is that the use of the reduced density cement slurry provides a reduced hydrostatic pressure in the wellbore. A still further advantage is that less cementitious material may be used to achieve the desired compressive strength, and therefore composition complexity and the overall costs for formulating the cement composition may be reduced. Another advantage is that the reduced density slurries provide a reduced density option for use in critical cementing operations that require high compressive strength cements.

The cement composition comprises a composite material. Generally, the composite material comprises a monophase amorphous hydraulic binder material (hereafter "MAHBM") which serves as an amorphous coating for a particulate core. Generally, the composite material has particle size distribution in the nano/micro scale range.

Examples of the MAHBM generally include, but are not limited to, calcium silicate hydrate, α-dicalcium silicate hydrate, β-dicalcium silicate hydrate, γ-dicalcium silicate hydrate, tricalcium silicate hydrate, calcium aluminate hydrates, aluminate hydrates, or any combination thereof. A specific example of the MAHBM is a dicalcium silicate hydrate. It is to be understood that the composition of the MAHBM is a factor of the materials from which it is produced. As such, other elements such as aluminum, sulfur, phosphorous, etc. may be incorporated into the structure of the MAHBM. For example, if the MAHBM is a calcium silicate hydrate, the calcium silicate hydrate may also comprise aluminum, sulfur, phosphorus, etc. incorporated into the structure of the MAHBM in some degree if certain minerals are used as a starting material. Starting materials from which the MAHBM may be produced include, but are not limited to, quartz, sand, limestone, concrete, cement, glass, slag, etc. These materials may be crystallized via hydrothermal synthesis or other such suitable method (this may require additional reagents depending on the selected starting material as would be apparent to one of ordinary skill in the art) to form a crystalline pre-coating material. Seed crystals may also be used to increase the rate of crystallization if desired. The resulting crystalline pre-coating material is then made amorphous through physical agitation and partial dehydration. One example of physical agitation is the grinding of a crystalline calcium silicate hydrate. The crystalline pre-coating material is physically agitated for a sufficient time so as to break as many hydrogen bonds in the crystalline structure as is necessary to render the crystalline pre-coating material amorphous. Typically, this may involve the conversion of the crystalline pre-coating material into a very fine powder. The process may be confirmed as completed by X-ray diffraction and/or IR spectroscopy as would be readily apparent to one of ordinary skill in the art. The crystalline pre-coating material or the amorphous material is then dehydrated. Dehydration may occur at any time in the process, including simultaneously with the physical agitation process. Preferably, the crystalline pre-coating material or the resulting amorphous material is only partially dehydrated and is not totally dehydrated. Drying time and temperature may be controlled so as to ensure total dehydration of the resulting amorphous coating material does not occur. After physical agitation and partial dehydration, the resulting MAHBM may be coated on to the particulate core.

Figure 1:
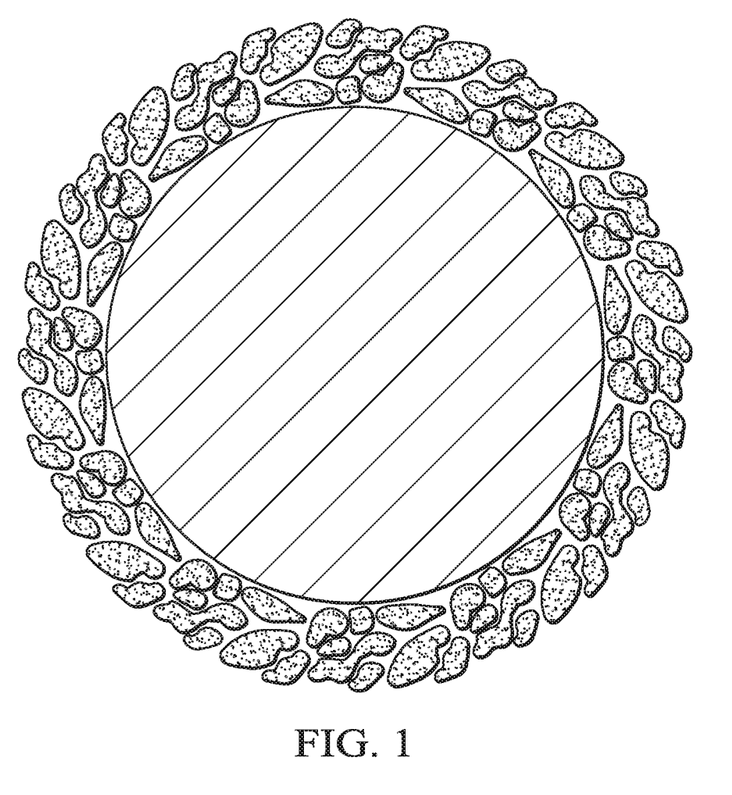
FIG. 1 is a schematic illustrating an example composite material in accordance with one or more examples described herein.

The MAHBM may be applied to the particulate core using any sufficient coating application method to form the composite material. Examples of coating application methods include, but are not limited to, intergrinding, precipitation, crystallization, shear mixing, spraying, applying as a mist, atomizing into a dry flow stream, and the like. Intergrinding is the preferred coating method. FIG. 1 is an illustration of an example composite material having a specific MAHBM (e.g., an amorphous dicalcium silicate hydrate coating) and a specific crystalline silica particulate core. In some examples, the particulate core may be crystalline. In other examples, the particulate core may not be crystalline. Examples of the particulate core include, but are not limited to, crystalline silica (i.e., quartz or $SiO_2$), cement particulates (any type of cement particulate), glass beads, ceramic beads, barium sulfate, iron oxide, manganese oxide, iron hydroxide, fly ash, silica fume, metakaolin, volcanic glass, slag, pozzolanic particulates, cement kiln dust, feldspar, calcined shale, opaline shale, pumice, pumicite, diatomaceous earth, volcanic ash, tuft, or any combination thereof. In some examples, the core may be reactive with the MAHBM and the two may react to increase the adhesion of the MAHBM to the core. In some examples, the coating application may function to adhere the MAHBM to the core. For example, the intergrinding method of coating application may be used as the physical agitation process for the crystalline pre-coating material. This intergrinding destroys the hydrogen bonds of the crystalline pre-coating material forming reactive particulates that deposit on to the particulate cores as they are interground with the crystalline pre-coating material. Optionally, the partial dehydration process may also be performed during this step to enhance this deposition on to the particulate cores. In still other examples, a coupling agent may be used to increase adhesion of the MAHBM to the core. The coupling agent may be any agent capable of binding at least one of the MAHBM (or any intermediary thereof) and the particulate core. In some examples, the coupling agent may bind both the MAHBM and the particulate core.

It should be clearly understood that the example composite material illustrated by FIG. 1 is merely one general application of the principles of this disclosure in practice, and a wide variety of other examples are possible. Therefore, the scope of this disclosure is not limited in any manner to the details of FIG. 1 as described herein.

The particulate core is selected such that when coated with the MAHBM, the composite material will have a nano/micro particle size distribution. Generally, the composite material has a $D_{50}$ particle size distribution of 5 μm to 500 μm. One specific example of the particle size distribution of the composite material is $D_{10}$=0.5 μm, $D_{50}$=7.2 μm, and $D_{90}$=48 μm as measured by sieve analysis. Further, the composite material has a high water requirement relative to other hydraulic materials. The water requirement may be approximately 65% in some examples. Additionally, the composite material has a low specific gravity of generally 3.20 or less.

While the water requirement for typical Portland cements may be around 35% and most fly ashes around 31%, cement compositions that include the composite material may have water requirements of about 50% to about 250% and, more particularly, from about 50% to about 80%. The cement composition may be analyzed to determine its water requirement. Water requirement is typically defined as the amount of mixing water that is required to be added to a powdered, solid material to form a slurry of a specified consistency. The consistency may vary for a particular application. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement component may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing the mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

As the composite material reduces the density of the cement compositions, additional density-reducing agents may be excluded from the cement compositions. For example, any lightweight additive or density-reducing additive known in the art may be expressly excluded from the cement compositions. Examples of such additives may include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art. As another example, the cement compositions may comprise one or more defoamers to reduce or eliminate foaming of the cement compositions. Any defoamer or defoaming technique sufficient for reducing foaming of the cement composition may be used.

The concentration of the composite material in the cement composition may range from about 1% (w/w) to about 99% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the composite material in the cement composition may range from about 1% (w/w) to about 99% (w/w), from about 5% (w/w) to about 99% (w/w), from about 10% (w/w) to about 99% (w/w), from about 15% (w/w) to about 99% (w/w), from about 20% (w/w) to about 99% (w/w), from about 25% (w/w) to about 99% (w/w), from about 30% (w/w) to about 99% (w/w), from about 35% (w/w) to about 99% (w/w), from about 40% (w/w) to about 99% (w/w), from about 45% (w/w) to about 99% (w/w), from about 50% (w/w) to about 99% (w/w), from about 55% (w/w) to about 99% (w/w), from about 60% (w/w) to about 99% (w/w), from about 65% (w/w) to about 99% (w/w), from about 70% (w/w) to about 99% (w/w), from about 75% (w/w) to about 99% (w/w), from about 80% (w/w) to about 99% (w/w), from about 85% (w/w) to about 99% (w/w), from about 90% (w/w) to about 99% (w/w), or from about 95% (w/w) to about 99% (w/w). As another example, the concentration of the composite material in the cement composition may range from about 1% (w/w) to about 99% (w/w), from about 1% (w/w) to about 95% (w/w), from about 1% (w/w) to about 90% (w/w), from about 1% (w/w) to about 85% (w/w), from about 1% (w/w) to about 80% (w/w), from about 1% (w/w) to about 75% (w/w), from about 1% (w/w) to about 70% (w/w), from about 1% (w/w) to about 65% (w/w), from about 1% (w/w) to about 60% (w/w), from about 1% (w/w) to about 55% (w/w), from about 1% (w/w) to about 50% (w/w), from about 1% (w/w) to about 45% (w/w), from about 1% (w/w) to about 40% (w/w), from about 1% (w/w) to about 35% (w/w), from about 1% (w/w) to about 30% (w/w), from about 1% (w/w) to about 25% (w/w), from about 1% (w/w) to about 20% (w/w), from about 1% (w/w) to about 15% (w/w), from about 1% (w/w) to about 10% (w/w), or from about 1% (w/w) to about 5% (w/w). With the benefit of this disclosure, one of ordinary skill in the art will be readily able to prepare a cement composition having a sufficient concentration of the composite material for a given application.

Examples of the compositions, methods, and systems described herein comprise the use of a cement composition. As previously mentioned, the cement composition comprises the composite material and a cement. Any of a variety of cements suitable for use in subterranean cementing operations may be used in the cement composition. Suitable examples include hydraulic cements that comprise calcium, aluminum, silicon, oxygen, and/or sulfur, and which set and harden by reaction with water. Such hydraulic cements, include, but are not limited to, Portland cements, pozzolan cements, gypsum cements, high-alumina-content cements, slag cements, silica/lime cements, Sorel cement, or any combination thereof. In certain specific examples, the hydraulic cement may comprise a Portland cement. The Portland cements that may be suitable for use include Portland cements classified as Class A, C, H and G cements according to the American Petroleum Institute, Recommended Practice for Testing Well Cements, API Specification 10B-2 (ISO 10426-2), First edition, July 2005. Examples of pozzolan cements may include, but are not limited to, fly ash, silica fume, metakaolin, granulated blast furnace slag, calcined shale, opaline shale, pumice, pumicite, diatomaceous earth, volcanic ash, tuft, cement kiln dust, and any combination thereof. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime (calcium source) to induce a cementitious reaction on its own. In addition, in some examples, cements suitable for use may include cements classified as ASTM Type I, II, III, IV, or V. With the benefit of this disclosure, one of ordinary skill in the art will be readily able to select a cement for a cement composition for a given application.

The concentration of the cement in the cement composition may range from about 1% (w/w) to about 99% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader of values. For example, the concentration of the cement in the cement composition may range from about 1% (w/w) to about 99% (w/w), from about 5% (w/w) to about 99% (w/w), from about 10% (w/w) to about 99% (w/w), from about 15% (w/w) to about 99% (w/w), from about 20% (w/w) to about 99% (w/w), from about 25% (w/w) to about 99% (w/w), from about 30% (w/w) to about 99% (w/w), from about 35% (w/w) to about 99% (w/w), from about 40% (w/w) to about 99% (w/w), from about 45% (w/w) to about 99% (w/w), from about 50% (w/w) to about 99% (w/w), from about 55% (w/w) to about 99% (w/w), from about 60% (w/w) to about 99% (w/w), from about 65% (w/w) to about 99% (w/w), from about 70% (w/w) to about 99% (w/w), from about 75% (w/w) to about 99% (w/w), from about 80% (w/w) to about 99% (w/w), from about 85% (w/w) to about 99% (w/w), from about 90% (w/w) to about 99% (w/w), or from about 95% (w/w) to about 99% (w/w). As another example, the concentration of the cement in the cement composition may range from about 1% (w/w) to about 99% (w/w), from about 1% (w/w) to about 95% (w/w), from about 1% (w/w) to about 90% (w/w), from about 1% (w/w) to about 85% (w/w), from about 1% (w/w) to about 80% (w/w), from about 1% (w/w) to about 75% (w/w), from about 1% (w/w) to about 70% (w/w), from about 1% (w/w) to about 65% (w/w), from about 1% (w/w) to about 60% (w/w), from about 1% (w/w) to about 55% (w/w), from about 1% (w/w) to about 50% (w/w), from about 1% (w/w) to about 45% (w/w), from about 1% (w/w) to about 40% (w/w), from about 1% (w/w) to about 35% (w/w), from about 1% (w/w) to about 30% (w/w), from about 1% (w/w) to about 25% (w/w), from about 1% (w/w) to about 20% (w/w), from about 1% (w/w) to about 15% (w/w), from about 1% (w/w) to about 10% (w/w), or from about 1% (w/w) to about 5% (w/w). With the benefit of this disclosure, one of ordinary skill in the art will be readily able to prepare a cement composition having a sufficient concentration of cement for a given application.

In some optional examples, the cement compositions may further comprise hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included to form a hydraulic composition with the cement. Where present the hydrated lime may be included, in the cement compositions in an amount in the range of from about 10% to about 100% by weight of the cement. In some examples, the hydrated lime may be present in an amount ranging between and/or including any of about 1%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100% by weight of the cement. With the benefit of this disclosure, one of ordinary skill in the art will be readily able to prepare a cement composition having a sufficient concentration of hydrated lime for a given application.

The cement compositions described herein comprise an aqueous fluid, for example, freshwater, saltwater (e.g., water containing one or more salts dissolved therein), brine (e.g., saturated saltwater produced from subterranean formations), seawater, or any combination thereof. Generally, the aqueous fluid may be from any source provided that the aqueous fluid does not contain an excess of compounds that may undesirably affect other components in the cement composition. In the case of brines, the aqueous fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. One of ordinary skill in the art, with the benefit of this disclosure, should be readily able to select an aqueous fluid for a chosen application.

Further, the aqueous fluid may be present in an amount sufficient to form a pumpable slurry. The concentration of the aqueous fluid in the cement composition may range from about 25% (w/w) to about 80% (w/w). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous fluid in the cement composition may range from about 25% (w/w) to about 80% (w/w), from about 30% (w/w) to about 80% (w/w), from about 35% (w/w) to about 80% (w/w), from about 40% (w/w) to about 80% (w/w), from about 45% (w/w) to about 80% (w/w), from about 50% (w/w) to about 80% (w/w), from about 55% (w/w) to about 80% (w/w), from about 60% (w/w) to about 80% (w/w), from about 65% (w/w) to about 80% (w/w), from about 70% (w/w) to about 80% (w/w), or from about 75% (w/w) to about 80% (w/w). As another example, the concentration of the aqueous fluid in the cement composition may range from about 25% (w/w) to about 80% (w/w), from about 25% (w/w) to about 75% (w/w), from about 25% (w/w) to about 70% (w/w), from about 25% (w/w) to about 65% (w/w), from about 25% (w/w) to about 60% (w/w), from about 25% (w/w) to about 55% (w/w), from about 25% (w/w) to about 50% (w/w), from about 25% (w/w) to about 45% (w/w), from about 25% (w/w) to about 40% (w/w), from about 25% (w/w) to about 35% (w/w), or from about 25% (w/w) to about 30% (w/w). With the benefit of this disclosure, one of ordinary skill in the art will be readily able to prepare a cement composition having a sufficient concentration of aqueous fluid for a given application.

Optionally, the cement composition may further comprise a cement set retarder. A broad variety of cement set retarders may be suitable for use. For example, the cement set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable cement set retarders include, among others, phosphonic acid derivatives. Generally, the cement set retarder may be present in the cement composition in an amount sufficient to delay setting for a desired time. The cement set retarder may be present in the cement composition in an amount in the range of from about 0.01% to about 10% by weight of the cement. More particularly, the cement set retarder may be present in an amount ranging between any of and/or including any of about 0.01%, about 0.1%, about 1%, about 2%, about 4%, about 6%, about 8%, or about 10% by weight of the cement. One of ordinary skill in the art, with the benefit of this disclosure, should recognize the appropriate amount of the cement set retarder to include for a chosen application.

Optionally, the cement compositions may further comprise a dispersant. Where present, the dispersant should act, among other things, to control the rheology of the cement composition. While a variety of dispersants known to those skilled in the art may be used, examples of particular dispersants include, but are not limited to, naphthalene sulfonic acid condensate with formaldehyde; acetone, formaldehyde, and sulfite condensate; melamine sulfonate condensed with formaldehyde; sulfonated-formaldehyde-based dispersants (e.g., sulfonated acetone formaldehyde condensate), polycarboxylated ether dispersants, or any combination thereof. In some examples, the dispersant may be present in the cement composition in an amount in the range of from about 0.1% to about 5% by weight of the cement. With the benefit of this disclosure, one of ordinary skill in the art will be readily able to prepare a cement composition having a sufficient concentration of dispersant for a given application.

Other optional additives suitable for use in subterranean cementing operations may also be added to the cement compositions. Examples of such additives include, but are not limited to, strength-retrogression additives, set accelerators, weighting agents, lightweight additives, gas-generating additives, mechanical property enhancing additives, lost-circulation materials, fluid-loss-control additives, foaming additives, thixotropic additives, and any combination thereof. Specific examples of these, and other, additives include crystalline silica, amorphous silica, fumed silica, salts, fibers, hydratable clays, calcined shale, vitrified shale, microspheres, fly ash, diatomaceous earth, metakaolin, ground perlite, rice husk ash, natural pozzolan, zeolite, cement kiln dust, resins, any combination thereof, and the like. A person having ordinary skill in the art, with the benefit of this disclosure, will readily be able to determine the type and amount of additive useful for a particular application and desired result.

Strength-retrogression additives may be included in examples of the cement composition to prevent the retrogression of strength after the cement composition has been allowed to set. These additives may allow the cement composition to form as intended, preventing cracks and premature failure of the cement composition. Examples of suitable strength-retrogression additives may include, but are not limited to, amorphous silica, coarse grain crystalline silica, fine grain crystalline silica, or a combination thereof.

Set accelerators may be included in examples of the cement composition to increase the rate of the setting reaction. Control of setting time may provide the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof.

Weighting agents may be included in examples of the cement composition to increase the density of the cement composition. Examples of suitable weighting agents include, but are not limited to, ground barium sulfate, barite, hematite, calcium carbonate, siderite, llmenite, magnesium oxide, sand, salt, or a combination thereof.

Lightweight additives may be included in examples of the cement composition to decrease the density of the cement composition. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in examples of the cement composition to release gas at a predetermined time, which may be beneficial to prevent gas migration from the formation through the cement composition before it hardens. The generated gas may combine with or inhibit the permeation of the cement composition by formation gas. Examples of suitable gas-generating additives include, but are not limited to, metal particles (e.g., aluminum powder) that react with an alkaline solution to generate a gas.

Mechanical-property-enhancing additives may be included in examples of the cement composition to ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in examples of the cement composition to help prevent the loss of fluid circulation into the subterranean formation. Examples of lost-circulation materials include, but are not limited to, cedar bark, shredded cane stalks, mineral fiber, mica flakes, cellophane, calcium carbonate, ground rubber, polymeric materials, pieces of plastic, grounded marble, wood, nut hulls, formica, corncobs, and cotton hulls.

Fluid-loss-control additives may be included in examples of the cement composition to decrease the volume of fluid that is lost to the subterranean formation. Properties of the cement composition may be significantly influenced by their water content. The loss of fluid can subject the cement composition to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Foaming additives may be included in examples of the cement composition to facilitate foaming and/or stabilize the resultant foam formed therewith. Examples of suitable foaming additives include, but are not limited to, mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof.

Defoaming additives may be included in examples of the cement composition to reduce the tendency of the cement composition to foam during mixing and pumping of the settable compositions. Examples of suitable defoaming additives include, but are not limited to, polyol silicone compounds.

Thixotropic additives may be included in examples of the cement composition to provide a settable composition that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water-soluble carboxyalkyl, hydroxyalkyl, mixed carboxyalkyl hydroxyalkyl of either cellulose, polyvalent metal salts, zirconium oxychloride with hydroxyethyl cellulose, or a combination thereof.

Those of ordinary skill in the art will appreciate that the slurry of the cement composition has a density suitable for a particular application. By way of example, the cement composition may have a slurry density of about 4 pounds per gallon ("lb/gal") to about 18 lb/gal. In certain examples, the cement composition may have a slurry density of about 8 lb/gal to about 18 lb/gal. As discussed above, the cement composition may achieve these densities without foaming and/or without other means of reducing density, such as lightweight additives. In some alternative examples, the cement composition may comprise weighting agents or other means to increase the slurry density of the cement composition. Those of ordinary skill in the art, with the benefit of this disclosure, will recognize the appropriate density for a particular application.

The cement compositions may set to have a desirable compressive strength after activation. Compressive strength is generally the capacity of a material or structure to withstand axially-directed pushing forces. The compressive strength may be measured at a specified time while the cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, Recommended Practice for Testing Well Cements, First Edition, July 2005.

By way of example, the cement composition may develop a 24-hour compressive strength in the range of from about 200 psi to about 8000 psi; alternatively, from about 2200 psi to about 3000 psi; or alternatively, from about 2500 psi to about 3000 psi. In particular, the cement compositions may develop a compressive strength in 24 hours of at least about 50 psi, at least about 100 psi, at least about 200 psi, or more. The compressive strength values may be determined using destructive or non-destructive methods at any temperature. In some examples, the cement composition may develop a 24-hour compressive strength in the range of from about 2000 psi to about 3000 psi and a slurry density of less than 14 lb/gal. As a specific example, the cement composition may have a compressive strength greater than 2500 psi and a slurry density of 13.2 lb/gal.

The cement composition has a desirable thickening time for any number of applications. Thickening time typically refers to the time a fluid, such as a cement composition slurry, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The cement composition may have a thickening time greater than about 30 minutes, greater than about 1 hour, greater than about 2 hours, greater than about 3 hours, greater than about 4 hours, greater than about 5 hours, greater than about 10 hours, greater than about 15 hours, or greater than about 30 hours at 3,000 psi and temperatures in a range of from about 50° F. to about 400° F.

As will be appreciated by those of ordinary skill in the art, the cement composition may be used in a variety of subterranean operations, including primary and remedial cementing. For example, a cement composition may be provided that comprises the composite material, a cement, and water. The cement composition may be mixed to provide a slurry having a desirable density. The cement composition slurry may then be introduced into a subterranean formation and allowed to set therein. As used herein, introducing the cement composition slurry into a subterranean formation includes introduction into any portion of the subterranean formation, including, without limitation, into a wellbore drilled into the subterranean formation, into a near wellbore region surrounding the wellbore, or into both.

In primary cementing applications, for example, a cement composition slurry may be introduced into an annular space between a conduit located in a wellbore and the walls of a wellbore (and/or a larger conduit in the wellbore), wherein the wellbore penetrates the subterranean formation. The cement composition slurry may be allowed to set in the annular space to form a hardened annular sheath. The cement composition may form a barrier that prevents the migration of fluids in the wellbore. The cement composition may also be used to support the conduit in the wellbore.

In remedial cementing applications, the cement composition may be used, for example, in squeeze-cementing operations or in the placement of plugs. By way of example, the cement composition slurry may be placed in a wellbore to plug an opening (e.g., a void or crack) in the formation, in a gravel pack, in the conduit, in the annular sheath, and/or between the annular sheath and the conduit (e.g., a microannulus).

Example systems may comprise a pump fluidly coupled to a tubular, the tubular containing a cement composition as described herein. The pump may be a high-pressure pump or a low-pressure pump. As used herein, the term "high pressure pump" will refer to a pump that is capable of delivering a fluid downhole at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the cement composition is formulated. In various examples, the pump (e.g., a low-pressure pump, a high-pressure pump, or a combination thereof) may convey the cement composition slurry from the mixing tank to the transporting conduit. In other examples, the cement composition may be formulated offsite and transported to a worksite, in which case the cement composition slurry may be introduced to the transporting conduit via the pump either directly from its shipping container (e.g., a truck, a railcar, a barge, or the like) or from a transport pipeline. In either case, the cement composition slurry may be drawn into the pump, elevated to an appropriate pressure, and then introduced into the transporting conduit for delivery downhole.

When desired for use, the composite material may be added to the dry blend cement, with or without additives, and mixed with an aqueous fluid to provide the cement composition slurry. In alternative examples, the aqueous base fluid may be added to the dry blend cement to provide a cement composition slurry, and then the composite material may be added to the cement composition slurry. The components and additives of the cement composition may be added or introduced to one another in any order and at any time during the use of the cement composition.

Figure 2:
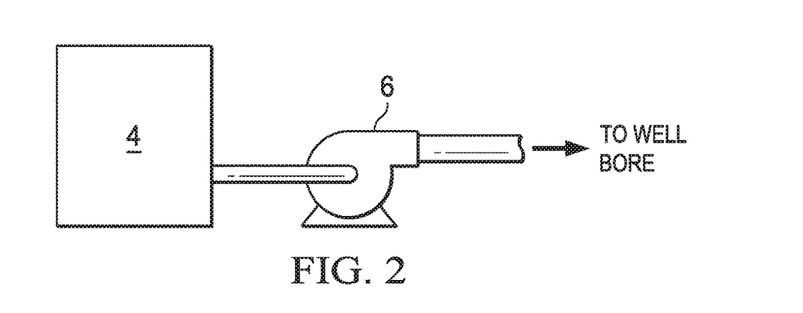
FIG. 2 is a schematic illustrating a system for the preparation and delivery of a cement composition to a wellbore in accordance with one or more examples described herein.

With reference to FIG. 2, preparation of a cement composition will now be described. FIG. 2 is a schematic illustrating a system 2 for the preparation of the cement composition and its subsequent delivery to a wellbore. As shown, the cement composition may be stored in a vessel 4 and then pumped via pumping equipment 6 to the wellbore. The vessel 4 and the pumping equipment 6 may be disposed on one or more cement trucks as will be apparent to those of ordinary skill in the art. The composite material may be added to the dry blend cement composition or the cement composition slurry in the vessel 4. If added to the dry blend cement composition, an aqueous fluid may then be added to the dry blend cement composition to form the cement composition slurry. Alternatively, the composite material may be added to the cement composition slurry as it is being pumped from the vessel 4. Alternatively, the composite material may be added to the cement composition slurry after the cement composition slurry has been pumped into the wellbore. In some examples, a jet mixer may be used, for example, to continuously mix the composite material and the cement composition slurry as it is being pumped to the wellbore. Alternatively, a re-circulating mixer and/or a batch mixer may be used to mix the composite material and the cement composition slurry (or dry blend). In some examples, the composite material may be added to the mixer as powdered particulates prior to pumping the cement composition slurry. Additionally, batch mixer type units may be plumbed in line with a separate vessel containing the composite material. The composite material may then be fed in-line with the cement composition slurry as it is pumped out of the vessel 4. There is no preferred method for preparing or mixing the cement composition, and one having ordinary skill in the art should be readily able to prepare, mix, and pump the cement composition using the equipment on hand.

Figure 3:
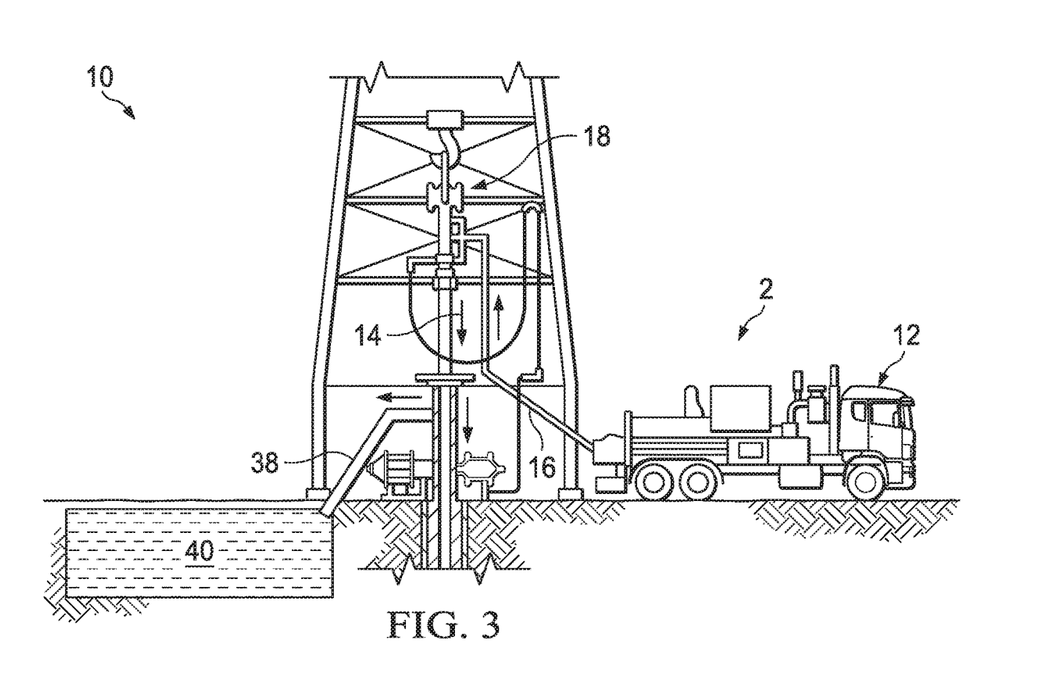
FIG. 3 is a schematic illustrating surface equipment that may be used in the placement of a cement composition in a wellbore in accordance with one or more examples described herein.

An example technique for placing a cement composition into a subterranean formation will now be described with reference to FIG. 3. FIG. 3 is a schematic illustrating surface equipment 10 that may be used in the placement of a cement composition in accordance this disclosure. It should be noted that while FIG. 3 generally depicts a land-based operation, those skilled in the art will readily recognize that the principles described herein are equally applicable to subsea operations that employ floating or sea-based platforms and rigs, without departing from the scope of the disclosure. As illustrated by FIG. 3, the surface equipment 10 may include a cementing unit 12, which may include one or more cement trucks. The cementing unit 12 may include the vessel 4 and the pumping equipment 6 shown in FIG. 2 which is represented by system 2 on the cementing unit 12, as will be apparent to those of ordinary skill in the art. The cementing unit 12 may pump a cement composition 14 through a feed pipe 16 and to a cementing head 18 which conveys the cement composition 14 downhole.

Figure 4:
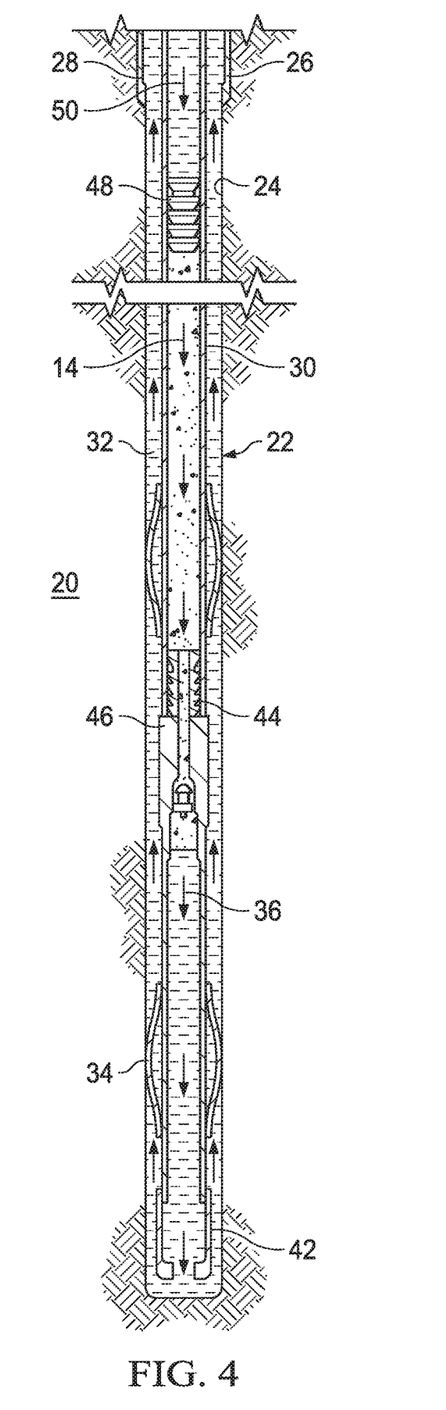
FIG. 4 is a schematic illustrating the placement of a cement composition into a wellbore annulus in accordance with one or more examples described herein.

FIG. 4 is a schematic illustrating the placement of the cement composition 14 into a subterranean formation 20. As illustrated, a wellbore 22 may be drilled into the subterranean formation 20. While the wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated schematic, a surface casing 26 has been inserted into the wellbore 22. The surface casing 26 may be cemented to the walls 24 of the wellbore 22 by cement sheath 28. In the illustrated schematic, one or more additional conduits (e.g., intermediate casing, production casing, liners, etc.), shown here as casing 30, may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 4, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form an annular sheath that supports and positions the casing 30 in the wellbore 22. While not illustrated, other techniques may also be utilized for introduction of the cement composition 14. By way of example, reverse circulation techniques may be used. These techniques may include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 3. Referring again to FIG. 4, a bottom plug 44 may be introduced into the wellbore 22 ahead of the cement composition 14, for example, to separate the cement composition 14 from the displaced fluids 36 that may be inside the casing 30 prior to cementing. After the bottom plug 44 reaches the landing collar 46, a diaphragm or other suitable device should rupture to allow the cement composition 14 through the bottom plug 44. In FIG. 4, the bottom plug 44 is shown on the landing collar 46. In the illustrated schematic, a top plug 48 may be introduced into the wellbore 22 behind the cement composition 14. The top plug 48 may separate the cement composition 14 from a displacement fluid 50 and also push the cement composition 14 through the bottom plug 44. The cement composition 14 may then follow the path of the prior pumped displaced fluids 36 and be pumped downhole through the casing shoe 42 and then uphole into the wellbore annulus 32 to its desired destination where it may be allowed to thicken and set.

It should be clearly understood that the cement compositions, systems, and techniques illustrated by FIGS. 2-4 are merely general applications of the principles of this disclosure in practice, and a wide variety of other examples are possible. Therefore, the scope of this disclosure is not limited in any manner to the details of FIGS. 2-4 as described herein.

EXAMPLES

The present disclosure may be better understood by reference to the following examples, which are offered by way of illustration. The present disclosure is not limited to the examples provided herein.

Example 1

A comparative experiment was run to test the compressive strength of the composite material against other supplementary cementitious materials (hereafter "SCM") for a general lightweight cement blend. The dry blend comprised the same fixed percentage of components, and the amount of the subsequently added aqueous fluid was varied to provide a final cement slurry density of 13.2 lb/gal for each of the four cement slurry formulations. The fixed dry blend formulation is illustrated by Table 1 below.

TABLE 1

Dry Blend Formulation

| Component | Formulation (% By Weight of Blend) |
| --- | --- |
| SCM Material (Variable based on Table 2) | 25.2% |
| Type I/II Portland Cement | 31.3% |
| Fly Ash Type F | 43.5% |

After each dry blend component was weighed according to the percentages of Table 1, the dry blend formulations were mixed and then blended with water in a Waring blender per API specifications. The four formulations were then cured for three days at 220° F. and 3000 psi and then crushed to measure the compressive strength values for each sample. Note that the Type I/II Portland SCM material is treated as a control, as this formulation contained an additional 25.2% of Type I/II Portland making the Type I/II Portland cement the entirety of the primary cementing material and providing this control formulation a total Type I/II Portland percentage of 56.5% by weight of the dry blend. The compressive strength results as sorted by the varying SCM material for each of the four cured cement compositions is illustrated in Table 2 below. The difference in compressive strength of the non-composite material containing compositions relative to the composite material composition was also calculated.

TABLE 2

Compressive Strength Results

| SCM Material | Compressive Strength (psi) | % Compressive Strength Decrease as Compared to the Composite Material |
| --- | --- | --- |
| Composite Material | 2555 | — |
| Type I/II Portland Cement (Control) | 1477 | 42.2 |
| Silica Fume | 1792 | 29.9 |
| Volcanic Glass | 1695 | 33.4 |

As illustrated, the cement composition containing the composite material possessed the highest measured compressive strength of all of the formulations while also providing a lightweight cement slurry density of 13.2 lb/gal.

Example 2

Another comparative experiment was prepared to test the compressive strength of a lightweight cement composition comprising the composite material against a conventional cement composition having a higher density. Table 3 illustrates a formulation for the experimental cement composition comprising the composite material.

TABLE 3

Formulation for Composite Material Cement Composition

| Component | Weight (g) |
| --- | --- |
| Type I/II Portland Cement | 297.5 |
| Fly Ash Type F | 413.2 |
| Composite Material | 239.6 |
| Fluid Loss Additive | 4.8 |
| Suspending Agent | 1.0 |
| Defoamer | 2.4 |
| Aqueous Fluid | 629.6 |
| Total Volume | 1.0 L |
| Dry Bulk Blend Wt. | 950.3 |
| Slurry Density | 13.2 lb/gal |

A comparative slurry of a more conventional design was prepared. Table 4 illustrates a formulation for this control cement composition.

TABLE 4

Formulation for Control Cement Composition

| Component | Weight (g) |
| --- | --- |
| Class H Cement | 597.5 |
| Fly Ash Type F | 521.2 |

TABLE 4-continued

Formulation for Control Cement Composition

| Component | Weight (g) |
|---|---|
| Bentonite | 11.2 |
| Fluid Loss Additive | 6.7 |
| Dispersant | 2.8 |
| Defoamer | 5.6 |
| Aqueous Fluid | 579.2 |
| Total Volume | 1.0 L |
| Dry Bulk Blend Wt. | 1129.8 |
| Slurry Density | 14.4 lb/gal |

Both of the dry blend formulations were mixed and then blended with water in a Waring blender per API specifications. The resulting cement composition slurries were then cured in an UCA for one day at 220° F. and 3000 psi and then crushed to measure the compressive strength values for each sample. The compressive strength results for each formulation is illustrated by Table 5 below.

TABLE 5

Compressive Strength Results

| Cement Formulation | Compressive Strength (psi) |
|---|---|
| Composite Material | 2357 |
| Control | 1375 |

The cement composition formulated with the composite material had a 41.7% higher compressive strength and an 8.3% lower slurry density than the conventional cement composition. Moreover, the cement composition formulated with the composite material used 15.9% less cementitious materials for the same slurry volume to achieve these results.

It is also to be recognized that the disclosed cement compositions may also directly or indirectly affect the various downhole equipment and tools that may contact the cement compositions disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-4.

Provided are methods of cementing in accordance with the disclosure and the illustrated FIGs. An example method comprises introducing a cement composition into a wellbore penetrating a subterranean formation, the cement composition comprising a composite material, a cement, and an aqueous fluid. The composite material comprises a monophase amorphous hydraulic binder material and a particulate core. The monophase amorphous hydraulic binder material coats the particulate core. The method further comprises allowing the cement composition to set in the wellbore.

Additionally or alternatively, the method may include one or more of the following features individually or in combination. The monophase amorphous hydraulic binder material may comprise calcium silicate hydrate, α-dicalcium silicate hydrate, β-dicalcium silicate hydrate, γ-dicalcium silicate hydrate, tricalcium silicate hydrate, calcium aluminate hydrate, aluminate hydrate, or any combination thereof. The monophase amorphous hydraulic binder material may be coated on the particulate core with a coating method selected from the group consisting of intergrinding, precipitation, crystallization, shear mixing, spraying, applying as a mist, atomizing into a dry flow stream, and any combination thereof. The particulate core may be a crystalline silica, cement particulate, glass bead, ceramic bead, barium sulfate, iron oxide, manganese oxide, iron hydroxide, fly ash, silica fume, metakaolin, volcanic glass, slag, pozzolanic particulate, cement kiln dust, feldspar, calcined shale, opaline shale, pumice, pumicite, diatomaceous earth, volcanic ash, tuft or any combination thereof. The cement may be selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof. The cement composition may not comprise any lightweight additives other than the composite material. The cement composition may have a slurry density of less than 18 lb/gal. The cement composition may provide a compressive strength of at least 200 psi after curing for one day or greater. The composite material may have a $D_{50}$ particle size distribution of 5 μm to 500 μm.

Provided are cement compositions in accordance with the disclosure and the illustrated FIGs. An example cement composition comprises a composite material, a cement, and an aqueous fluid. The composite material comprises a monophase amorphous hydraulic binder material and a particulate core. The monophase amorphous hydraulic binder material coats the particulate core.

Additionally or alternatively, the cement composition may include one or more of the following features individually or in combination. The monophase amorphous hydraulic binder material may comprise calcium silicate hydrate, α-dicalcium silicate hydrate, β-dicalcium silicate hydrate, γ-dicalcium silicate hydrate, tricalcium silicate hydrate, calcium aluminate hydrate, aluminate hydrate, or any combination thereof. The monophase amorphous hydraulic binder material may be coated on the particulate core with a coating method selected from the group consisting of intergrinding, precipitation, crystallization, shear mixing, spraying, applying as a mist, atomizing into a dry flow stream, and any combination thereof. The particulate core may be a crystalline silica, cement particulate, glass bead, ceramic bead, barium sulfate, iron oxide, manganese oxide, iron hydroxide, fly ash, silica fume, metakaolin, volcanic glass, slag, pozzolanic particulate, cement kiln dust, feldspar, calcined shale, opaline shale, pumice, pumicite, diatomaceous earth, volcanic ash, tuft or any combination thereof. The cement may be selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof. The cement composition may not comprise any lightweight additives other than the composite material. The cement composition may have a slurry density of less than 18 lb/gal. The cement composition may provide a compressive strength of at least 200 psi after curing for one day or greater. The composite material may have a $D_{50}$ particle size distribution of 5 μm to 500 μm.

Provided are systems for cementing in accordance with the disclosure and the illustrated FIGs. An example system comprises a cement composition comprising a composite material, a cement, and an aqueous fluid. The composite material comprises a monophase amorphous hydraulic binder material and a particulate core. The monophase amorphous hydraulic binder material coats the particulate core. The system further comprises mixing equipment configured to mix the composite material, the cement, and the aqueous fluid; and a pump fluidly coupled to a tubular extending into a wellbore penetrating a subterranean formation, wherein the tubular is configured to circulate or otherwise convey the cement composition in the wellbore.

Additionally or alternatively, the system may include one or more of the following features individually or in combination. The monophase amorphous hydraulic binder material may comprise calcium silicate hydrate, α-dicalcium silicate hydrate, β-dicalcium silicate hydrate, γ-dicalcium silicate hydrate, tricalcium silicate hydrate, calcium aluminate hydrate, aluminate hydrate, or any combination thereof. The monophase amorphous hydraulic binder material may be coated on the particulate core with a coating method selected from the group consisting of intergrinding, precipitation, crystallization, shear mixing, spraying, applying as a mist, atomizing into a dry flow stream, and any combination thereof. The particulate core may be a crystalline silica, cement particulate, glass bead, ceramic bead, barium sulfate, iron oxide, manganese oxide, iron hydroxide, fly ash, silica fume, metakaolin, volcanic glass, slag, pozzolanic particulate, cement kiln dust, feldspar, calcined shale, opaline shale, pumice, pumicite, diatomaceous earth, volcanic ash, tuft or any combination thereof. The cement may be selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof. The cement composition may not comprise any lightweight additives other than the composite material. The cement composition may have a slurry density of less than 18 lb/gal. The cement composition may provide a compressive strength of at least 200 psi after curing for one day or greater. The composite material may have a $D_{50}$ particle size distribution of 5 μm to 500 μm.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for cementing, the method comprising:
   introducing a cement composition into a wellbore penetrating a subterranean formation, the cement composition comprising:
      a composite material comprising:
         a monophase amorphous hydraulic binder material comprising a material selected from the group consisting of calcium silicate hydrate, α-dicalcium silicate hydrate, β-dicalcium silicate hydrate, γ-dicalcium silicate hydrate, tricalcium silicate hydrate, calcium aluminate hydrate, aluminate hydrate, and any combination thereof; and
         a particulate core; wherein the monophase amorphous hydraulic binder material coats the particulate core; wherein the monophase amorphous hydraulic binder material is coated on the particulate core with a coating method selected from the group consisting of intergrinding, precipitation, crystallization, shear mixing, spraying, applying as a mist, atomizing into a dry flow stream, and any combinations thereof;
      a cement; and
      an aqueous fluid; and
   allowing the cement composition to set in the wellbore.

2. The method of claim 1, wherein the particulate core is a crystalline silica, cement particulate, glass bead, ceramic bead, barium sulfate, iron oxide, manganese oxide, iron hydroxide, fly ash, silica fume, metakaolin, volcanic glass, slag, pozzolanic particulate, cement kiln dust, feldspar, calcined shale, opaline shale, pumice, pumicite, diatomaceous earth, volcanic ash, tuft or any combination thereof.

3. The method of claim 1, wherein the cement is selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof.

4. The method of claim 1, wherein the cement composition does not comprise any lightweight additives other than the composite material.

5. The method of claim 1, wherein the cement composition has a slurry density of less than 18 lb/gal.

6. The method of claim 1, wherein the cement composition provides a compressive strength of at least 200 psi after curing for one day or greater.

7. The method of claim 1, wherein the composite material has a $D_{50}$ particle size distribution of 5 µm to 500 µm.

8. A cement composition comprising:
a composite material comprising:
a monophase amorphous hydraulic binder material comprising a material selected from the group consisting of calcium silicate hydrate, α-dicalcium silicate hydrate, β-dicalcium silicate hydrate, y-dicalcium silicate hydrate, tricalcium silicate hydrate, calcium aluminate hydrate, aluminate hydrate, and any combination thereof; and
a particulate core; wherein the monophase amorphous hydraulic binder material coats the particulate core; wherein the monophase amorphous hydraulic binder material is coated on the particulate core with a coating method selected from the group consisting of intergrinding, precipitation, crystallization, shear mixing, spraying, applying as a mist, atomizing into a dry flow stream, and any combinations thereof;
a cement; and
an aqueous fluid.

9. The composition of claim 8, wherein the particulate core comprises a crystalline silica, cement particulate, glass bead, ceramic bead, barium sulfate, iron oxide, manganese oxide, iron hydroxide, fly ash, silica fume, metakaolin, volcanic glass, slag, pozzolanic particulate, cement kiln dust, feldspar, calcined shale, opaline shale, pumice, pumicite, diatomaceous earth, volcanic ash, tuft or any combination thereof.

10. The composition of claim 8, wherein the cement is selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof.

11. The composition of claim 8, wherein the cement composition does not comprise any lightweight additives other than the composite material.

12. The composition of claim 8, wherein the cement composition has a slurry density of less than 18 lb/gal.

13. The composition of claim 8, wherein the composite material has a $D_{50}$ particle size distribution of 5 µm to 500 µm.

14. A system for cementing, the system comprising:
a cement composition comprising:
a composite material comprising:
a monophase amorphous hydraulic binder material comprising a material selected from the group consisting of calcium silicate hydrate, α-dicalcium silicate hydrate, β-dicalcium silicate hydrate, y-dicalcium silicate hydrate, tricalcium silicate hydrate, calcium aluminate hydrate, aluminate hydrate, and any combination thereof; and
a particulate core; wherein the monophase amorphous hydraulic binder material coats the particulate core; wherein the monophase amorphous hydraulic binder material is coated on the particulate core with a coating method selected from the group consisting of intergrinding, precipitation, crystallization, shear mixing spraying, applying as a mist, atomizing into a dry flow stream, and any combinations thereof;
a cement; and
an aqueous fluid; and
mixing equipment configured to mix the composite material, the cement, and the aqueous fluid;
a pump fluidly coupled to a tubular extending into a wellbore penetrating a subterranean formation, wherein the tubular is configured to circulate or otherwise convey the cement composition in the wellbore.

15. The system of claim 14, wherein the cement composition has a slurry density of less than 18 lb/gal and does not comprise any lightweight additives other than the composite material.

16. The system of claim 14, wherein the particulate core is a crystalline silica, cement particulate, glass bead, ceramic bead, barium sulfate, iron oxide, manganese oxide, iron hydroxide, fly ash, silica fume, metakaolin, volcanic glass, slag, pozzolanic particulate, cement kiln dust, feldspar, calcined shale, opaline shale, pumice, pumicite, diatomaceous earth, volcanic ash, tuft or any combination thereof.

17. The system of claim 14, wherein the cement is selected from the group consisting of Portland cement, pozzolan cement, gypsum cement, high-alumina-content cement, slag cement, silica/lime cement, fly ash, silica fume, metakaolin, granulated blast furnace slag, calcined shale, opaline shale, pumice, pumicite, diatomaceous earth, volcanic ash, tuft, cement kiln dust, Sorel cement, and any combinations thereof.

18. The system of claim 14, wherein the cement composition does not comprise any lightweight additives other than the composite material.

19. The system of claim 14, wherein the cement composition has a slurry density of less than 18 lb/gal.

20. The system of claim 14, wherein the cement composition provides a compressive strength of at least 200 psi after curing for one day or greater.

* * * * *